US005826246A

United States Patent [19]

Bator et al.

[11] Patent Number: 5,826,246

[45] Date of Patent: Oct. 20, 1998

[54] SECURE POSTAGE METER IN AN ATM APPLICATION

[75] Inventors: Feliks Bator, Easton; William Berson, Weston; John L. Campo, Trumbull; Kathryn V. Lawton, Brandford; Andrei Obrea, Georgetown; Michael Y. Swaluk, Redding; Monroe A. Weiant, Jr., Trumbull, all of Conn.

[73] Assignee: Pitney Bowes Inc., Stamford, Conn.

[21] Appl. No.: 775,545

[22] Filed: Dec. 31, 1996

[51] Int. Cl.[6] .......................... G07B 17/02; G06F 17/60; G06F 157/00

[52] U.S. Cl. ........................................ 705/403; 705/410

[58] Field of Search ...................... 235/375; 364/464.13, 364/464.18, 464.2; 380/25; 705/403, 408, 410

[56] References Cited

U.S. PATENT DOCUMENTS

| | | | |
|---|---|---|---|
| 3,596,247 | 7/1971 | Eckert, Jr. | 340/825.33 |
| 4,024,380 | 5/1977 | Gunn | 235/61.9 A |
| 4,218,011 | 8/1980 | Simjian | 235/375 |
| 4,249,071 | 2/1981 | Simjian | 235/375 |
| 4,258,252 | 3/1981 | Simjian | 235/432 |
| 4,629,871 | 12/1986 | Scribner et al. | 235/375 |
| 4,802,218 | 1/1989 | Wright et al. | 380/23 |
| 4,809,185 | 2/1989 | Talmadge | 705/403 |
| 4,831,555 | 5/1989 | Sansone et al. | 705/408 X |
| 4,900,905 | 2/1990 | Pusic | 235/381 |
| 4,901,241 | 2/1990 | Schneck | 705/401 |
| 4,908,770 | 3/1990 | Breault et al. | 705/404 |
| 4,911,087 | 3/1990 | Couvrette | 109/24.1 |
| 4,940,887 | 7/1990 | Sheng-Jung | 235/381 |
| 4,941,091 | 7/1990 | Breault et al. | 705/401 X |
| 4,978,839 | 12/1990 | Chen et al. | 235/375 |
| 4,980,542 | 12/1990 | Jackson et al. | 235/375 |
| 5,111,030 | 5/1992 | Brasington et al. | 235/375 |
| 5,265,033 | 11/1993 | Vajk et al. | 395/200.3 |
| 5,272,640 | 12/1993 | Wu | 364/464.02 |
| 5,313,404 | 5/1994 | Wu | 364/478 |
| 5,369,258 | 11/1994 | Sansone et al. | 235/381 |
| 5,457,636 | 10/1995 | Sansone et al. | 364/478 |
| 5,473,143 | 12/1995 | Vajk et al. | 235/380 |
| 5,503,436 | 4/1996 | Alpaugh et al. | 283/71 |
| 5,583,779 | 12/1996 | Naclerio et al. | 705/408 |
| 5,606,613 | 2/1997 | Lee et al. | 380/25 X |

*Primary Examiner*—Edward R. Cosimano
*Attorney, Agent, or Firm*—Alberta A. Vitale; Steven J. Shapiro; Melvin J. Scolnick

[57] ABSTRACT

A postage metering capability is integrated in an automated teller machine. With minimal modification and using several components of the ATM to perform functions useful in dispensing of postage, the secured environment of an ATM is used to implement numerous postage metering functions. When used with a smart card, postage value is accounted for without reference to an internal vault of the apparatus or to a postal facility, by using a vault of the smart card. The smart card may be used to dispense postage by accessing a customer's postage account at a remote center to set into the internal vault a value to be dispensed, with communication secured in accordance with information provided by the smart card. Using such information, the customer's postage account may also be accessed to recharge the vault of the smart card, rather than the internal vault. Additionally, postage may be dispensed in accordance with value inputted directly by a customer, using cash, credit-, debit-, or money-cards. The internal vault of the postage meter is used when accounting for postage dispensed in accordance with such directly inputted value.

19 Claims, 2 Drawing Sheets

SECURE POSTAGE METER IN AN ATM APPLICATION

TECHNICAL FIELD

This invention relates to postage meters, and more particularly to postage meters which, while secure and capable of full service, are made available to the public inexpensively by use of existing ATM facilities as host systems therefor.

BACKGROUND ART

Demand for postal services is virtually universal. However, while businesses typically enjoy use of postage meters and thus can avoid the necessity for and inconvenience of trips to post offices or elsewhere to purchase stamps, as well as inconvenience of affixing stamps to mail pieces, such services and advantages are typically unavailable to individuals. Thus, individual users are presently unable to benefit from advantages associated with use of postage metering systems.

One reason for lack of availability of postage metering devices for individuals is that individuals do not typically have a sufficient volume of postage utilization to justify the expense associated with purchase or lease, and maintenance, of individual postage meters. Moreover, while facilities are available wherein personnel are available for operating postage meters and providing other services for the public, at the present time there are no known facilities which provide public postage meters for secure direct use by members of the public, at any time of day.

For example, Schneck U.S. Pat. No. 4,901,241 provides a postage value system for a postage meter which would allow members of the public to purchase postage values of any denomination in a public facility, such as a post office, and which does not require carrying a meter to a post office for charging. The reference requires purchasing an optical debit card from the post office for carrying postage values, to eliminate the necessity for carrying meters to the post office. However, other than securing the card by providing identification and authentication indicia, security considerations are not provided either for the system disclosed therein or for signal transmissions between the card and system. Accordingly, the disclosed system is limited to operation at the post office where it may be kept under surveillance and is incapable of dealing with cash or other accounts of value.

Another type of an automated postal teller machine is found in U.S. Pat. Nos. 5,313,404 and 5,272,640. The apparatus disclosed therein receives, conveys and weighs mail, calculates postage, classifies mail, prints ZIP codes and records data, in an unmanned condition under control of a microcomputer. As described, the postal teller includes added facilities for accepting payment, incorporating devices for receiving and recognizing money and for providing coin changing. Moreover, the device is required to accept payment by money card, with appropriate accounting.

However, the teaching of U.S. Pat. No. 5,313,404 fails to describe accounting facilities for the value being stored therein and dispensed thereby. Thus, there is provided only a broad description that the system may include a modem for communicating with a remote host for connection with a general post office, so that the general monitor center can control the operation of the system. As the postal teller is not disclosed as having a facility for accounting for the postage dispensed by the apparatus, or for recharging with additional postage, it is inferred that the system disclosed therein is necessarily associated with an existing post office facility, thus failing to provide a widespread, universally available postage metering apparatus for use by individual members of the public.

Failure to provide such universal availability of public postage meters for individual use may relate to lack of availability of sites which, while remote from post office facilities, nonetheless are secure from unauthorized use, access or pilferage. Specifically, postage meters generate and dispense value. As such, any widespread distribution of meter sites requires that equipment at each site be capable of securely implementing an accounting of the value associated with the meters, including value dispensed by and stored in the postage meters. In order for public postage meters to be commercially viable, such security measures must be provided inexpensively. Absence of public postage meters may also be due to a perceived requirement for costly reliance on service personnel for recharging such public meters.

Thus, the apparatus disclosed in U.S. Pat. No. 5,272,640 is described in the Abstract thereof as a system which "can be operated by only one postal clerk", and clearly does not relate to a system for use by the general public. Accordingly, neither of the above noted disclosures provides any internal security measures, which are clearly necessary for devices to be used by the public.

While numerous service centers are available for providing office services, which include parcel postage packaging, mail metering, use of mailboxes, etc., such centers necessarily result in an increase in the cost of simple postage services (such as postage metering) provided to the public, in light of the requirement for and reliance on personnel associated therewith as well as because such centers occupy significant floor space and thus incur rental expenses which must be passed on to the customers.

There is thus a need in the prior art for facilities capable of providing postage metering services on a widespread and inexpensive basis for use by individual members of the public.

There is more particularly a need for postage meters which, while universally available and operating in a secure public environment, do not result in significant increases in labor expense or in rental expense to their owners.

There is still a more specific need in the prior art for postage meter facilities available to the public which may be recharged in a number of complementary ways, including: 1) acceptance of postage value from a vault of a smart card having a postage metering function; 2) acceptance of authorization by a smart card to draw funds from a user's postage account, whether maintained locally or at a remote meter service center, for addition to an internal vault used by the postage meter to dispense postage; or 3) acceptance of value, in the form of cash, credit, debit, or money cards, provided directly by the user.

SUMMARY OF THE INVENTION

It is accordingly an object of the present invention to overcome the difficulties of the prior art and to provide postage meters which are widely available to public users.

It is a more particular object of the invention to provide public postage meters which operate in a secure environment.

It is yet another object of the invention to provide a public postage meter which uses an existing facility which implements a separate function; which is situated in a secure environment; and which includes component elements useful both for implementing the separate function and for implementing the postage dispensing function.

It is still another object of the invention to provide public postage meters operating with reduced accounting requirements and which do not require labor expense for maintaining accounting of the value associated therewith.

It is yet another object of the invention to provide public postage meter facilities which may securely dispense postage value independently of value associated with an internal vault thereof and of a connection to a post office or service center, by secured acceptance of postage value from a vault of a smart card having a postage metering function.

It is another object of the invention to provide public postage meter facilities which may be recharged by acceptance of authorization by a smart card to draw funds from a user's postage account for addition to an internal vault used by the public postage meter to disperse postage.

It is still another object of the invention to provide public postage meter facilities which may be recharged by acceptance of value, in the form of cash, credit, debit, or money cards, provided directly by the user.

In accordance with the invention, there is thus provided an apparatus enabling individual members of the public to access and operate postage meters in a secure manner.

There is more particularly provided a postage metering apparatus, associated with an apparatus known as an ATM (automated teller machine) or the like, located in a secure site and having existing printing, communication, display and customer input/output facilities, for dispensing postage to individual members of the public.

A device in accordance with the invention, when combined with an existing host ATM, thus includes an input/output section for communication with a customer, including a keyboard (or other device) for user input and a display for outputting information to the user, a printer for printing postage indicia, and a communication facility for communicating with either a post office or a remote service center.

The inventive device further provides, in an existing secure facility such as an ATM, a secure postage printer controller, controlling the printer for printing postage indicia directly on a mail piece or on a separate postage stamp to be affixed thereto, and a weighing apparatus for weighing the mail piece to determine an appropriate amount of postage to be provided therefor.

The inventive device further includes a postage dispensing system operating in any of four modes of operation.

In a first mode, where value is provided to the apparatus from a smart card having its own vault, the contents of an internal vault of the apparatus are neither used nor modified. Thus, the postage meter in the ATM is free to operate in isolation from the U.S. postal system. Instead, the meter controller of the inventive apparatus accesses descending and ascending registers of the smart card, using secure communication via the input/output port of the apparatus. Upon determining that an appropriate amount of value remains in the descending register of the smart card, the meter controller securely controls the postage meter, thus maintaining appropriate accounting for an amount of postage requested by the user. More specifically, the meter controller decrements the descending register and increments the ascending register of the card vault by the requested postage value, for example. The meter controller then causes the meter to dispense the appropriate postage value.

In a second mode, where value is to be charged against a credit account maintained by the user with the service center, the inventive apparatus may operate in conjunction with a smart card having appropriate account, meter and/or pseudo random encryption information. The smart card may be connected to an input/output port of the inventive apparatus and (when combined with specific information keyed in to the apparatus by the user) provides the complete information to be used by the apparatus in encrypted communication with the service center. In this mode, the descending register in the internal vault of the apparatus is updated and the credit account at the service center is debited when enabling the printer to print postage for the user.

In a third mode, where value is directly inputted to the apparatus in the form of a credit card, debit card or as cash, an internal vault of the inventive apparatus increments a descending register in a known manner according to the inputted value and, thereafter, decrements the descending register and increments the ascending register upon dispensing the postage.

In the fourth mode, the inventive apparatus operates as a postage resetting system for changing (e.g., increasing) the available postage value in a smart card carried by a member of the public. In such a system, the apparatus of the invention operates similarly to the manner of operation for dispensing postage. For example, the apparatus may communicate with a remote center over existing communication facilities of an ATM. However, instead of resetting its own internal vault and dispensing postage value, the system resets the vault of the smart card and provides the remote center with an accurate accounting of the value thus added by the device. By incrementing a descending register of the smart card provided thereto, the invention permits further use of the card for additional postage.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

Figure 1:
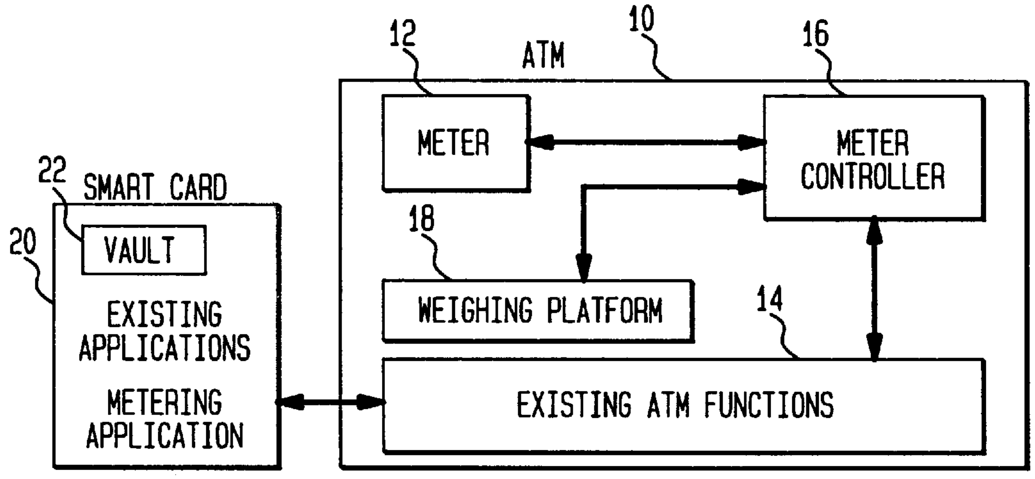
FIG. 1 illustrates an embodiment of the invention implementing a mode of operation independent of an internal vault.

Referring now to the drawings, in FIG. 1 there is shown an arrangement wherein a known automatic teller machine (ATM) 10, of a type available at numerous locations for conducting financial transactions, is modified pursuant to the invention to include a postage meter 12. The ATM 10 is controlled by a computer, programmed to cause the various components of the ATM to implement the various functions performed by such an ATM, such as receiving and reading a card having financial and/or account information thereon, dispensing cash and debiting an account identified on the card, implementing a level of security by verifying a user inputted code with information stored on the card or in the account to be debited, accessing and providing account information, transferring assets between accounts, and the like. Such control is symbolically illustrated in FIG. 1 by a block 14 labelled "existing ATM functions".

Similarly, the postage meter 12 implements known functions of printing postal indicia representing value and implementing an accounting procedure therefor, in accordance with inputted postage class, destination, and/or requested postage values requested by a user, verification of existence of sufficient funds, and the like. The postage meter 12 is controlled by a meter controller 16 which, as known in the art, may itself calculate a postage value to be dispensed in accordance with information inputted by the user and with weight of the mail piece as detected by a weighing platform 18.

Details of such postage meters and ATM devices are well known and, accordingly, are not repeated herein as such repetition does not add to disclosure and understanding of the invention.

Additionally, as shown in FIG. 1 a smart card 20 may be used in conjunction with the invention. Such a card is typically an integrated circuit value card having a microprocessor and memory (not shown), or memory only, configured to implement specified applications. Thus, as shown in FIG. 1, a smart card 20 to be usable with the invention may include several existing applications, whether for implementation in cooperation with the ATM or with other devices, and also includes metering applications. That is, the microprocessor of the card 20 may be programmed to perform various functions associated with the applications for which the card is suited. Alternatively, data may be stored in the memory of the card in a particular configuration usable in such applications.

It is a significant feature of the invention that the smart card 20 includes a vault therein, generally designated at 22, to enable meter controller 16 to implement a known accounting procedure for postage dispensed by meter 12. As will be appreciated from the configuration illustrated in FIG. 1, controller 16 implements its accounting function by referring to and updating the vault 22 of card 20, rather than an internal vault of meter 12. Such accounting is implemented by communication between controller 16 and card 20 through the existing ATM functions 14 which, as above noted, include communication with a card presented thereto for known ATM functions.

Advantageously, by implementing a modification in operation of the known meter controller 16 to implement its accounting by communicating with the card 20 using existing ATM functions 14, rather than by communicating with meter 12, the invention permits the postage meter to operate independently of its own internal vault and independently of requirements for recharging, or refilling, its internal vault.

As hereinabove described, it is known to issue smart cards by postal authorities to represent postage value.

Chen et al U.S. Pat. No. 4,978,839 for example, the contents of which are incorporated herein by reference, describes a postage meter recharging system using a smart card (or paper card), issued by a value card center either in fixed or variable denominations as requested. Such a card may be used in the embodiment of FIG. 1.

The apparatus of the present invention communicates, in a known secure and encrypted fashion as described below, with the metering application on card 20, to decrement a value stored in a descending register thereof for example, as well as to increment a value stored in an ascending register thereof, as a basis for controlling meter 12 to dispense postage. By providing for such communication between the controller 16 and card 20, it becomes possible to place the invention at sites remote from postal facilities, and to eliminate a requirement for communication between the meter and such facilities to recharge the meter.

Indeed, since the internal vault of the postage meter is not accessed during a transaction wherein a vault of a smart card is used, expenses associated with recharging or refilling of the meter vault, whether manually, automatically, or in any other fashion, are eliminated. Further, inasmuch as ATM facilities are physically secure, incorporation of the postage meter function therein eliminates a requirement to provide a separate secure facility therefor.

Accordingly, the embodiment of the invention illustrated in FIG. 1 provides a simple solution to the problem of obtaining secure sites for postage meters to be used by the public, permits the public to operate such sites without requiring expensive intervention of or assistance by personnel, and eliminates a requirement for recharging meters by employees of the facility owner since accounting is implemented independently of the meter's vault. Moreover, upon consideration of the foregoing, it is readily apparent that the same may be implemented easily and inexpensively, with minimal modification of existing facilities and functions, requiring only establishing a communication path between controller 16 and card 20 through existing ATM functions 14, rather than directly. In other respects, meter 12 functions similarly to known meters, responding to user inputs via a keyboard and providing outputs to the user via a display, both of which are available at the ATM 10.

Figure 2:
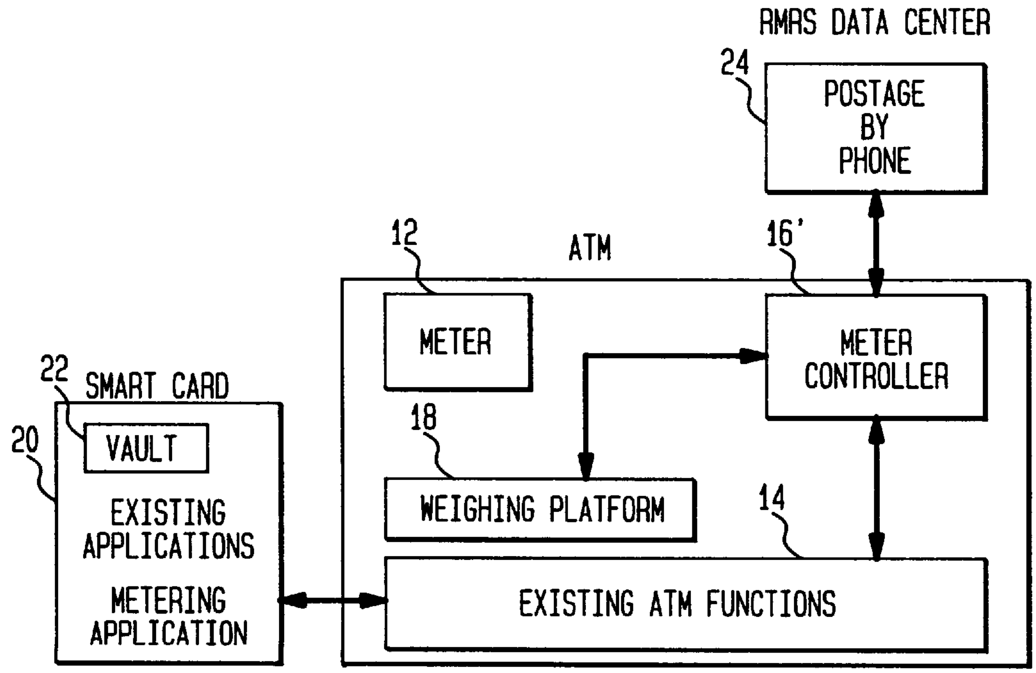
FIG. 2 shows an embodiment of the invention incorporating several modes of operation.

In a modification of the embodiment shown in FIG. 1, there is shown in FIG. 2 an embodiment which, in addition to the elements of FIG. 1, further provides communication between a modified meter controller 16' and a remote data center, shown as remote meter recharge system 24. Such remote recharging is known in the art, as described below. Thus, meter controller 16' represents known meter controller functions, in addition to those described for the embodiment of FIG. 1.

The embodiment of the invention shown in FIG. 2 thus enjoys each of the advantages of the embodiment of FIG. 1, but in addition also provides a service wherein accounting for the postage dispensed by meter 12 is implemented using the internal vault of the meter, in a known manner. Such accounting results in a requirement for recharging of the postage meter and, as is known in the art, recharging may be remotely implemented by communication with the remote data center 24.

Advantageously, by providing for communication with remote center 24, the embodiment of FIG. 2 permits the inventive postage meter at an ATM to accept payment from sources other than smart cards, such as credit cards, debit cards, money cards, and cash, all of which are already accessible to the host ATM 10. Thus, full service of the public postage meter, to permit any form of payment, is provided by the embodiment shown in FIG. 2. Moreover, by providing communication with the remote center 24, the embodiment of FIG. 2 permits refilling or resetting of a smart card 20 by accessing a user's account maintained at the remote center 24. Communication between the postage meter in a host ATM and remote center 24, as well as communication between the smart card 20 and meter controller 16 or 16', is implemented in a secure manner.

U.S. Pat. No. 4,629,871, the contents of which are incorporated herein by reference, implements secure communication between two facilities, such as a RMRS center and a meter, wherein each facility generates a combination which is a match of the other. The combination may be provided by a data link, such as a telephone and may be provided to an operator who then enters the numbers on a meter keyboard, or may be communicated without an operator.

Such security systems use sequences of "pseudo-random" numbers which are the same at the two facilities. When used with a data card, the data card is previously recorded at a central station with a pseudo-random number generated at the station and corresponding to the postal meter in which the card is being inserted. The number is changed with each recharging of the card, the previous number being employed to generate a new random number in accordance with an algorithm contained totally within the pseudo-random number generators both at the remote and the local unit.

When such a card is used to recharge a user's postage meter, Insertion of the card into the reader causes a pseudo-random generator to be incremented to its next pseudo-random number, which is placed in a meter combination register where it is stored until the next charging of the meter. The new combination replaces the old combination previously stored in such register. At the same time, the digital information corresponding to the identification code of the card is passed along a bi-directional line, where it accumulates in the read circuitry. In implementing a recharging of a meter, the combination read from the card is stored in a meter reading combination register. The information stored in this register and the read combination register are compared to begin a next cycle of operation, relative to the funding information from the card. This information is fed to a funding register of the meter, which may be a descending register operating in conjunction with the ascending register.

As previously noted, a descending register is provided on the card. As disclosed in the U.S. Pat. No. 4,629,871, such a card may also have a master combination register, comparison circuitry and gating circuitry, all interfacing with an input-output component, which connects to a connector such an edge connector which makes connection with the postage meter. The details of such communication are not repeated herein.

Figure 3:
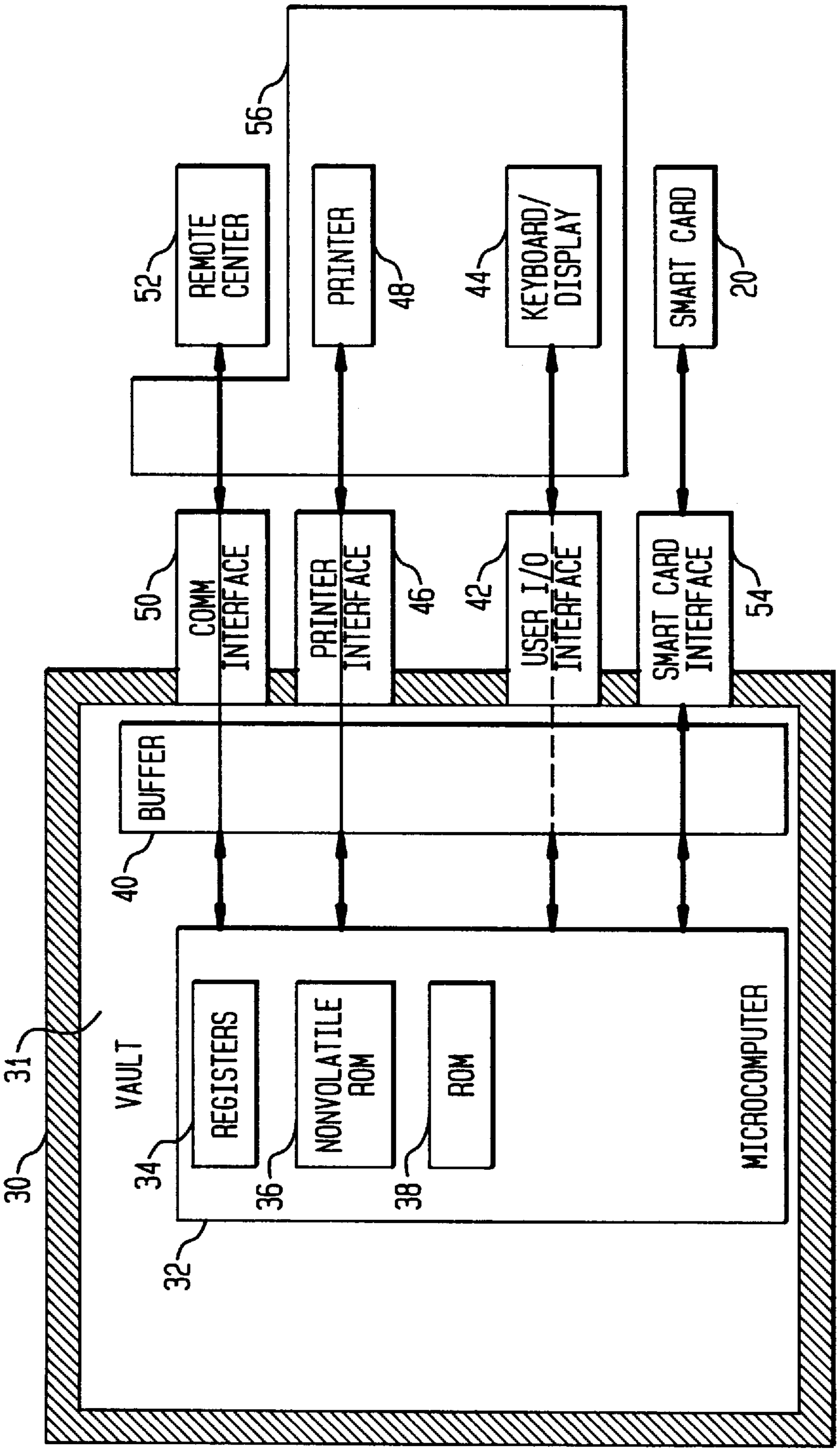
FIG. 3 represents an arrangement of the invention relative to a host ATM.

FIG. 3 shows one arrangement for interconnecting a postage meter to a host ATM. As shown therein, a secure housing 30 encloses an internal vault 31 of postage meter 12, including for example a microcomputer 32. Microcomputer 32 may comprise the meter controller 16 and 16' of FIGS. 1 and 2.

Vault 31 is provided for the control and accounting of operations of the postage meter 12. As will be appreciated from the foregoing description, in accordance with the present invention such a vault is also provided on smart card 20, operable in cooperation with, and detachable from, the housing 30 of the postage meter. Security of the vault housing is provided electronically, including the encryption system described herein and, at least in the case of the internal vault of the postage meter, is also provided by a mechanically secure structure.

A control and accounting system in accordance with the invention controls and accounts for the operation of a postage meter.

The postage meter may have physical sensors or other data sources, to enable the output of data related to postage meter operation. These sources may also comprise an arrangement capable of full protocol exchange with the vault and may thus comprise a source of other types of information than sensor information, such as accounting information and information that is read on demand from a memory within the postage meter. Postage meter 12 may further include an additional memory (not shown) for receiving data or programs for controlling the operation thereof. Such received data and/or program control may alternatively be directly employed in the operation of the postage meter.

As shown in the Figure, microcomputer 32 incorporates therein registers 34 and a nonvolatile memory 36 for the storage of data and variable operating parameters, and a read-only memory 38 for the storage of programs, encryption parameters, and constants. Vault 31 may be provided with a buffer 40 for coupling the microcomputer thereof to control interfaces 42, 46, 50 and 54. As weighing platform 18 is not part of the interconnection with the host ATM, the platform is not shown in FIG. 3. However, a separate interface is provided between microcomputer 32 and weighing platform 18.

While the security of the interfaces may comprise physical security as above discussed, and may be achieved, for example, by physically locking the internal vault within the machine as in the case of vault 31, security may alternatively, or in addition, be achieved by the provision of a logical interface. Thus, for example, the postage meter and the vault may be provided with means for enabling a series of information or other exchanges, such that the machine and vault know that they are connected to compatible equipment. Such exchanges may be effected without the exchange of data, and without the use of keys.

As shown in FIG. 3, at least four interfaces may be provided between the vault and various components with which it communicates, including the components commonly shared with the host ATM and any external components. Thus, a first interface 42 enables communication between microcomputer 32 in the internal vault 31 and a conventional keyboard/display unit 44 external of the secure housing 30. A second interface, printer interface 46, enables the microcomputer 32 to control a printer 48 for printing the postage indicia. A third interface, communication interface 50, enables the microcomputer to communicate with the remote service center 52 (such as the above mentioned RMRS), via a modem included in the ATM, for example. A fourth interface, smart card interface 54, enables the microcomputer to communicate with the smart card 20 and thus to implement the various functions hereinabove described. It should be understood that, although separate interfaces are shown communicating with the microcomputer, the invention may also be implemented by incorporating software control of the various components within the microcomputer itself, so that the interfaces shown in the drawing are simply and efficiently implemented by use of wiring interconnections.

It will thus be appreciated that advantageously, in accordance with the invention, the postage meter function is implemented without the requirement for a separate keyboard or display unit. By incorporating the vault 31 in an existing ATM, acting as a host therefor, the invention makes it possible to implement the necessary input keyboard functions and to output display functions using the existing input and output devices of the host ATM. Thus, the keyboard/display unit 44 for the combined system is located physically at (or near) the vault of the postage meter function, within the existing physically secured environment of the ATM, and it is not necessary to provide for a separate secure interconnection between the vault and the keyboard display.

Similarly, in accordance with the invention the postage meter function is implemented without the requirement for a separate print unit. That is, by incorporating the vault 31 in the existing host ATM the present invention makes it possible to implement the necessary print functions using the existing printer 48 of the host ATM, with minimal modifications.

Such modifications may include the following. For example, rather than (or in addition to) providing only one form (or medium) to the existing printer for generating an ATM receipt, in accordance with the invention a separate source of print medium may be used, to provide an adhesive backed (or other) medium for imprinting with postage indicia. Alternatively, an additional intake slot may be provided in the combined housing, along with a known transport mechanism, for receiving mail pieces such as envelopes and the like and for conveying the same to the printer, for direct imprinting of postal indicia thereon.

Thus, the printer for the combined system is located physically at (or near) the vault of the postage meter function, typically within the existing physically secured environment of the ATM, and it is not necessary to provide either a separate printer or a separate secure interconnection between the vault and the printer.

Still further, in accordance with the invention the postage meter function is implemented without the requirement for a separate communication facility for communicating with a recharging center, which may be remotely located. That is, by incorporating the vault 31 in the existing host ATM, the present invention makes it possible to implement an embodiment of the invention in which the microcomputer communicates with the remote service center 52, via a modem included in the ATM. The remote center 52, as hereinabove described, stores encryption data corresponding to that stored in the control system microcomputer 32, so that some or all of the signals pass between the remote center and the microcomputer may be encrypted.

Thus, the modem for the combined system is located physically at (or near) the vault of the postage meter function, typically within the existing physically secured environment of the ATM, and it is not necessary to provide either a separate modem or a separate secure interconnection between the vault and the modem.

The elements included in the ATM structure are shown enclosed within a common block 56, which also explicitly encloses interconnections therewith, to symbolize the fact that the postage meter 12, having a postage metering function, and the ATM, functioning to implement various cash, credit and banking transactions, are commonly housed and share these elements. Thus, the keyboard and display, the printer, and the connections to implement connection with the remote center are all used commonly by the ATM and the postage meter.

As shown in the figure, the smart card 20 is not permanently connected to the postage meter vault 31, and may be coupled thereto when operating in a smart card mode. Such an occasional connection is indicated by the dashed line connecting the smart card and the smart card interface 54. It should be understood that, although the smart card and its interface are shown in FIG. 3 as being outside the common block 56, in fact there may be provided an interconnection and operation of the smart card with both the postage meter function and the ATM. Thus, in accordance with the invention, to the extent that a smart card slot, interface or reader is commonly usable by both the host ATM and the postage meter, duplication of such features is avoided, and any such element may be included in the common block 56.

The smart card interface may thus be a card entry device, enabling transfer of data from smart card 20 to or from the microcomputer 32 upon insertion of the card in a slot in the interface, for example. As above noted, in one embodiment the card may itself be charged (debited) for dispensed postage, thus relieving the internal vault of the postage meter from accounting for a transaction. That is, the microcomputer may control the printer in accordance with value contained in, and accounted for by, the registers and storage of the smart card rather than value contained in the internal vault of the microcomputer.

Alternatively, the registers 34 in the microcomputer may be updated by means of data from the smart card to enable dispensing of additional postage pursuant to a request by the user. The use of smart cards for updating registers in secure systems is disclosed, for example, in U.S. Pat. Nos. 4,258,252; 4,218,011; and 4,249,071. Remote register resetting via telephone lines or the like is disclosed, for example, in U.S. Pat. No. 3,596,247.

As previously noted, in another mode of operation the card may receive authorization (or other data) from the control center, by way of a secured communication via the communication interface, under control of the microcomputer, and thus may be recharged at an ATM hosting a postage meter according to the invention.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

We claim:

1. An apparatus for performing banking and postage metering functions comprising:

a postage metering apparatus including a meter controller;

a host secure banking apparatus securely housing said postage metering apparatus, said host secure banking apparatus having a separate controller for implementing customer directed banking functions distinct from postage metering functions using a plurality of components thereof, the separate controller being distinct from said meter controller and said meter controller connected to the components of said host secure banking apparatus for implementing customer directed postage metering functions using the components of said host secure banking apparatus, said meter controller further securely accounting for postage value dispensed by said postage metering apparatus.

2. An apparatus as claimed in claim 1 wherein the customer directed banking functions include reconciliation of a customer banking account.

3. An apparatus as claimed in claim 1 further comprising a smart card removably connected to said host secure banking apparatus, whereby said smart card enables performance of meter applications and banking applications.

4. An apparatus in accordance with claim 1, wherein said postage metering apparatus further comprises an internal vault in a secure housing of said postage metering apparatus, the components of the host secure banking apparatus include a user input/output device, and said meter controller implements a postage dispensing operation responsively to a user input on said input/output device and accounts for the postage dispensed responsively to said user input using said internal vault.

5. An apparatus in accordance with claim 4, wherein the components of the host secure banking apparatus include a communication interface, said meter controller communicates with a remote center via said communication interface for implementing another postage dispensing operation responsively to another user input by implementing a secure communication with the remote center, said meter controller accounting for said another postage dispensing operation using said remote center.

6. An apparatus in accordance with claim 1, further comprising a user input device having a vault and being releasably connected to said secure banking apparatus and an interface connecting said meter controller with said user input device, said meter controller accounting for the dispensed postage value using the vault of said user input device.

7. An apparatus in accordance with claim 6, wherein said user input device comprises a smart card and the vault comprises a register in said smart card.

8. An apparatus in accordance with claim 6, wherein said postage metering apparatus further comprises an internal vault in a secure housing of said postage metering apparatus, the components of the host secure banking apparatus include a user input/output device, and said meter controller implements a postage dispensing operation responsively to a user input on said input/output device and accounts for the postage dispensed responsively to said user input using said internal vault.

9. An apparatus in accordance with claim 8, further comprising a remote center and wherein the components of the host secure banking apparatus further comprise a communication interface, said meter controller communicates with said remote center via said communication interface for implementing another postage dispensing operation responsively to another user input by implementing a secure communication with the remote center, and said meter controller accounting for said another postage dispensing operation using said remote center.

10. A host apparatus comprising:

a postage metering apparatus in a secure housing of said host apparatus;

an internal vault having a meter controller within said internal vault;

a plurality of components comprising a communication interface, a printer, and a user input/output device;

a separate controller distinct from said meter controller whereby said separate controller controls said host apparatus using said plurality of components to implement customer directed secure banking functions distinct from postage metering functions;

said meter controller connected to said plurality of components of said host apparatus, for implementing customer directed postage metering functions using said plurality of components of said host apparatus;

said meter controller securely accounting for postage value dispensed by said postage metering apparatus.

11. An apparatus in accordance with claim 10, whereby said meter controller uses said internal vault for accounting for dispensed postage value.

12. An apparatus in accordance with claim 10, further comprising a device connecting means for receiving a user card and means for receiving cash, said meter controller using said internal vault for accounting for dispensed postage value paid for by either of said user card or cash.

13. An apparatus in accordance with claim 12, wherein said meter controller communicates securely via said communication means with a remote center wherein account information is stored for recharging said internal vault thereof.

14. An apparatus in accordance with claim 10, further comprising a smart card removably connected to said host apparatus, said smart card having a postage accounting vault, and whereby said meter controller uses said postage accounting vault of said smart card for accounting for dispensed postage value printed by said printer.

15. An apparatus in accordance with claim 14, wherein said meter controller communicates securely via said communication interface with a remote center wherein account information is stored for recharging said vault of said smart card.

16. An apparatus in accordance with claim 14, further comprising means for receiving a user card and means for receiving cash, said meter controller using said internal vault for accounting for dispensed postage value paid for by either of said user card or cash.

17. An apparatus in accordance with claim 16, wherein said meter controller communicates securely via said communication interface with a remote center wherein account information is stored for recharging said internal vault thereof.

18. An apparatus in accordance with claim 17, wherein said meter controller communicates securely via said communication interface with a remote center wherein account information is stored for recharging said vault of said smart card.

19. A method of dispensing postage, comprising the steps of:

inserting a smart card into a host secure banking apparatus;

reading value information contained in a vault of the inserted smart card;

responsively to a user input, securely accounting in said vault of said smart card for value of postage requested to be dispensed; and printing indicia corresponding to said postage value.

* * * * *